(12) United States Patent
Grosse et al.

(10) Patent No.: US 11,904,705 B2
(45) Date of Patent: Feb. 20, 2024

(54) AUTOMATED RACK STORAGE SYSTEM, STORAGE-AND-RETRIEVAL UNIT AND METHOD FOR OPERATING A STORAGE-AND-RETRIEVAL UNIT

(71) Applicant: TGW Mechanics GmbH, Wels (AT)

(72) Inventors: Eric Grosse, Langen (DE); Martin Rausch, Gmunden (AT)

(73) Assignee: TGW Mechanics GmbH, Wels (AT)

( * ) Notice: Subject to any disclaimer, the term of this patent is extended or adjusted under 35 U.S.C. 154(b) by 1174 days.

(21) Appl. No.: 16/484,137

(22) PCT Filed: Feb. 9, 2018

(86) PCT No.: PCT/AT2018/060035
§ 371 (c)(1),
(2) Date: Oct. 1, 2019

(87) PCT Pub. No.: WO2018/145138
PCT Pub. Date: Aug. 16, 2018

(65) Prior Publication Data
US 2020/0017303 A1 Jan. 16, 2020

(30) Foreign Application Priority Data
Feb. 10, 2017 (AT) .............................. A 50111/2017

(51) Int. Cl.
*B65G 1/137* (2006.01)
*B60L 3/00* (2019.01)
(Continued)

(52) U.S. Cl.
CPC ............... *B60L 3/0015* (2013.01); *B60L 3/04* (2013.01); *B60L 5/38* (2013.01); *B60L 7/003* (2013.01);
(Continued)

(58) Field of Classification Search
CPC ............ B60L 3/0015; B60L 3/04; B60L 5/38; B60L 7/003; B60L 9/02; B60L 2200/26;
(Continued)

(56) References Cited

U.S. PATENT DOCUMENTS

| 4,892,980 A | 1/1990 | Riley |
| 9,744,861 B2 | 8/2017 | Toda et al. |
| 2016/0031687 A1* | 2/2016 | Grosse ..................... B60L 9/16 |
| | | 191/22 DM |

FOREIGN PATENT DOCUMENTS

| AT | 513977 B1 | 9/2014 |
| DE | 195 10 835 C1 | 10/1996 |

(Continued)

OTHER PUBLICATIONS

International Search Report in PCT/AT2018/060035, dated Jun. 12, 2018.

(Continued)

*Primary Examiner* — Kyle O Logan
(74) *Attorney, Agent, or Firm* — Collard & Roe, P.C.

(57) ABSTRACT

A method for operating a storage and retrieval unit (3) is specified, in which a rail line (1)/power-supply rail (6) is set to a risk-operation voltage when a risk posed by the storage and retrieval unit (3) is detected. In the storage and retrieval unit (3) the level of the voltage applied to the rail line (1)/power-supply rail (6) is measured and a current path between the rail line (1)/power-supply rail (6) and a drive motor (5, 5a . . . 5c) of the storage and retrieval unit (3) disconnected when the voltage measured is below a threshold value associated with a risk situation. Furthermore, a storage and retrieval unit (3) as well as an automated rack storage system for performing the proposed method is specified.

11 Claims, 6 Drawing Sheets

(51) Int. Cl.
  *B60L 3/04* (2006.01)
  *B60L 5/38* (2006.01)
  *B60L 7/00* (2006.01)
  *B60L 9/02* (2006.01)

(52) U.S. Cl.
  CPC .............. *B60L 9/02* (2013.01); *B65G 1/1375* (2013.01); *B60L 2200/26* (2013.01); *B60L 2220/20* (2013.01); *B60L 2240/427* (2013.01); *B60L 2240/46* (2013.01)

(58) Field of Classification Search
  CPC ........... B60L 2220/20; B60L 2240/427; B60L 2240/46; B65G 1/1375
  See application file for complete search history.

(56) References Cited

FOREIGN PATENT DOCUMENTS

| | | |
|---|---|---|
| EP | 3 054 578 A1 | 8/2016 |
| JP | 2009-073608 A | 4/2009 |
| JP | 2014-201402 A | 10/2014 |
| WO | 2011/062218 A1 | 5/2011 |
| WO | 2014/153584 A1 | 10/2014 |
| WO | 2016/033628 A1 | 3/2016 |
| WO | 2016/094923 A2 | 6/2016 |

OTHER PUBLICATIONS

UCC21520 4-A, 6-A, 5.7-kVRMS Isolated Dual-Channel Gate Driver, Texas Instruments, Jun. 2016—Revised Mar. 2020, 38 pages.

\* cited by examiner

AUTOMATED RACK STORAGE SYSTEM, STORAGE-AND-RETRIEVAL UNIT AND METHOD FOR OPERATING A STORAGE-AND-RETRIEVAL UNIT

CROSS REFERENCE TO RELATED APPLICATIONS

This application is the National Stage of PCT/AT2018/060035 filed on Feb. 9, 2018, which claims priority under 35 U.S.C. § 119 of Austrian Application No. A 50111/2017 filed on Feb. 10, 2017, the disclosure of which is incorporated by reference. The international application under PCT article 21(2) was not published in English.

BACKGROUND OF THE INVENTION

1. Field of the Invention

The invention relates to a method for operating a storage and retrieval unit movable on a rail line in an automated rack storage system having at least one storage rack disposed along the rail line, wherein the storage and retrieval unit is supplied with electric energy via a power supply electrically connected to the rail line and/or a power-supply rail and wherein the storage and retrieval unit is used to store piece goods in the storage rack or retrieve piece goods from the storage rack. During normal operation, the rail line/power-supply rail is set to a normal-operation voltage unless a risk posed by the storage and retrieval unit is detected. In a risk situation, when a risk posed by the storage and retrieval unit is detected, the rail line/power-supply rail is set, in contrast, to a risk-operation voltage, which is below the normal-operation voltage. Furthermore, the invention relates to a storage and retrieval unit having several rail wheels, a motor control and at least one drive motor connected to the motor control. The motor control is electrically connected to at least one rail wheel or a current collector configured for electrical connection to the power-supply rail. Finally, the invention also relates to an automated rack storage system having a rail line, at least one storage rack disposed along the rail line, as well as a storage and retrieval unit of the above-mentioned kind movable on the rail line. Moreover, said automated rack storage system comprises a power supply electrically connected to the rail line and/or a power-supply rail, which power supply and/or power-supply rail is in contact with the storage and retrieval unit.

2. Description of the Related Art

Such automated rack storage system and/or such method are known, in principle, from the prior art. There, said rail line is, for example, disposed between two rows of racks in a rack aisle, so that the storage and retrieval unit can serve the storage spaces on the left-hand side and on the right-hand side of the rail line, i.e. can store piece goods in the storage rack or retrieve piece goods from the latter. Evidently, also several rows of racks and rail lines can be disposed above one another, so that a store having several storage levels is created. A vertical conveyor connects the storage levels and transports the piece goods. The vertical conveyor adjoins a conveyor mechanism, by means of which the piece goods are transported to the vertical conveyor and piece goods are transported away from the vertical conveyor.

Although such rack storage systems are, as a rule, operated in a fully automated manner via a central control computer, it is required from time to time for an operator to enter a rack aisle, for example in order to perform maintenance work on the storage and retrieval unit, on the rail line or on the storage rack itself, and/or also in order to remove piece goods having become wedged during manipulation by the storage and retrieval unit. As the storage and retrieval units achieve high speeds and also have a relatively large mass, special safeguards must be taken in order to protect the operator from the storage and retrieval unit upon entering the rack aisle and/or the rail line.

A method for the safe operation of an automated rack storage system having storage racks and a rack aisle extending between the storage racks as well as a storage and retrieval unit moving within the former is known from WO 2016/033628 A1. The storage and retrieval unit has a control unit, a travel drive and a load suspension device. When access by an operator to one of the storage areas is registered at a switching device, an automated operation will be changed over to a safety operation. In the safety operation, those storage and retrieval units which would move within a protection area are moved to a holding position. The respective storage and retrieval unit remains in this holding position and is set to an idle state, which is risk-free for the operator, until the control unit receives a release signal once again.

A method is further known from WO 2014/153584 A1, in which the rail line/power-supply rail is set to a risk-operation voltage whose rectified value/root-mean-square value is below a minimum rectified value/minimum root-mean-square value required to move the storage and retrieval unit but above zero when a risk posed by the storage and retrieval unit is detected.

A disadvantage of this method is the fact that the risk-operation voltage must be rated comparatively accurately in order to avoid an undesired movement of the storage and retrieval unit. Due to unavoidable tolerances in the production of the storage and retrieval units, different designs of the storage and retrieval units and ultimately also operating states some of which are difficult to predict, as well as, for example, voltage fluctuations, a movement of the storage and retrieval unit cannot be excluded with ultimate certainty. This concerns, in particular, initial situations in which the storage and retrieval unit—possibly loaded with a heavy load—is in motion and keeps moving unexpectedly far due to the phenomenon of inertia and a relatively high risk-operation voltage.

SUMMARY OF THE INVENTION

It is therefore one object of the invention to specify an improved method for operating a storage and retrieval unit, an improved storage and retrieval unit and an improved automated rack storage system having a storage and retrieval unit. In particular, in a risk situation a travel movement of the storage and retrieval unit is to be effectively prevented while ensuring a minimum energy supply of the latter.

The object of the invention is achieved by a method of the kind mentioned at the beginning, in which
  a level of a voltage applied to the rail line/power-supply rail is measured in the storage and retrieval unit and
  a current path between the rail line/power-supply rail and at least one drive motor of the storage and retrieval unit is disconnected in the storage and retrieval unit when the voltage measured falls below a threshold value associated with the risk situation.

This means that the voltage applied to the rail line/power-supply rail is only passed on to a drive motor of the storage and retrieval unit (e.g. drive motor for the travel movement of the storage and retrieval unit along the rail line (x-direction) and/or drive motor for the positioning movement of the load suspension device transverse to the rail line (z-direction)) when the voltage measured is smaller than said threshold value. In particular, the threshold value is below the normal-operation voltage but is larger than or equal to the risk-operation voltage.

Furthermore, the object of the invention is achieved by means of a storage and retrieval unit of the kind mentioned at the beginning, additionally comprising a detection device adapted to measure a level of a voltage applied to the at least one rail wheel/the current collector and to disconnect a current path between the rail wheel/the current collector and a drive motor of the storage and retrieval unit when the voltage measured is smaller than the threshold value associated with a risk situation.

Finally, the invention is also achieved by an automated rack storage system comprising a storage and retrieval unit (or several storage and retrieval units) of the kind mentioned at the beginning, as well as a drive control adapted to detect a risk posed by the storage and retrieval unit (or the storage and retrieval units) and to set the rail line/power-supply rail during normal operation to a normal-operation voltage when there is no risk and to risk-operation voltage in a risk situation.

The presented measures enable the storage and retrieval unit (in case of a single-level storage and retrieval unit also referred to as "shuttle") to be supplied with electric energy even in a risk situation, for example in order to keep operational important electronic components having no back-up capacitor or back-up battery. This can concern, for example, a communication component or a position sensor or another sensor system of the storage and retrieval unit, so that the normal operation can be taken up again with no difficulty after a risk operation. It is also advantageous that a fault analysis and fault elimination at the supplied storage and retrieval unit is facilitated. For example, error codes can be displayed at the storage and retrieval unit and also, for example, the operation of setting sensors is facilitated by the sustained power supply.

Although the storage and retrieval unit is supplied with energy even in a risk situation, the measures taken guarantee an effective protection of a person located within the motion travel of the storage and retrieval unit. In this case, the rating of the risk-operation voltage is relatively non-critical, as a safe operating state is achieved in any case, even in unexpected and unforeseen initial situations, by the interruption of the current path to a drive motor or several drive motors of the storage and retrieval unit. Tolerances in the storage and retrieval units are non-critical, and the proposed procedure is also suitable for different designs of the storage and retrieval units. In order to safely disconnect the current path in case of the risk-operation voltage, the threshold value can, in particular, be below the normal-operation voltage and be larger than or equal to the risk-operation voltage.

A "risk situation" generally occurs whenever a risk posed by the storage and retrieval unit has been detected. A risk can be of various nature, however, a risk occurs in particular whenever a person gets or has got within the effective range or motion travel of the storage and retrieval unit. For example, a successful access of a person into the effective range and/or motion travel of the storage and retrieval unit can be detected using a sensor system, in particular an optical sensor, for example a light barrier, which is disposed in the area of an access to the effective range/motion travel of the storage and retrieval unit or even within the effective range/motion travel. Analogously, it would be conceivable that the access area is secured with a door equipped with a switching contact. With the help of this switching contact, it is also possible to detect an access of a person to the effective range/motion travel of the storage and retrieval unit. Moreover, an access request by a person to the effective range/motion travel of the storage and retrieval unit can be acquired at a switching device disposed in the immediate vicinity of the effective range/motion travel, for example with the help of a push button which the relevant person pushes. While there is currently no risk to the person at that point in time, such risk is imminent. Within the scope of the invention, such imminent risk is also assessed as a risk situation. In other words, the rack storage system can comprise a device for acquiring an access of a person to the effective range or motion travel of the storage and retrieval unit (for example a sensor system and/or a switching contact and/or a switching device, as described above), which is electrically connected to the drive control. The current path between the rail line/power-supply rail and a drive motor of the storage and retrieval unit is therefore disconnected in particular whenever the voltage measured falls below a threshold value associated with a risk situation of the above-mentioned kind.

The "operating voltage" is generally the voltage applied from the power supply to the rail line/power-supply rail and made available to the storage and retrieval unit. The "risk-operation voltage" is the special case of operating voltage being applied to the rail line/power-supply rail in a risk situation. The "normal-operation voltage" is the special case of operating voltage being applied to the rail line/power-supply rail when there is no risk situation. The "minimum travel voltage" is the minimum level of operating voltage required for a movement of the storage and retrieval unit and also refers to the moving storage and retrieval unit. This means that the storage and retrieval unit will stop in any case, even when in motion, when the minimum travel voltage is applied. The "start voltage" is the minimum level of operating voltage required for a movement of the storage and retrieval unit from standstill. Therefore, as a general rule, the start voltage is higher than the minimum travel voltage. In particular, the normal-operation voltage is above a start voltage of the storage and retrieval unit.

It is generally of advantage if the risk-operation voltage is below a contact voltage risky for humans, as thus even bare parts of the automated rack storage system carrying the risk-operation voltage pose no risk for humans.

In principle, on the basis of the proposed measures, the level of the risk-operation voltage can be rated in such a way that it is sufficiently high to move the storage and retrieval unit. In other words, the rectified value/root-mean-square value of the risk-operation voltage is then above a minimum rectified value/minimum root-mean-square value required to move the storage and retrieval unit. This is possible because the operation of disconnecting the current path to the drive motor results in a safe operating state anyway. In this way, in the case of risk operation, it is possible to supply even those consumers in the storage and retrieval unit with electric energy which need a relatively high voltage.

It is nevertheless advantageous if the rectified value/root-mean-square value of the risk-operation voltage is below a minimum rectified value/minimum root-mean-square value required to move the storage and retrieval unit but above zero. In this case, a travel movement of the storage and retrieval unit is excluded for physical reasons alone. In other words, the drive and/or travel motor of the storage and retrieval unit is supplied with too little energy to be able to move the storage and retrieval unit. Therefore, the protection of individuals is particularly effective. With the help of this measure, a double safety mechanism against an undesired movement of the storage and retrieval unit (e.g. a travel movement of the storage and retrieval unit along the rail line (x-direction) and/or a positioning movement of the load suspension device transverse to the rail line (z-direction) is achieved, as the storage and retrieval unit stops even if the operation of disconnecting the current path to the drive motor (e.g. drive motor for the travel movement of the storage and retrieval unit along the rail line (x-direction) and/or drive motor for the positioning movement of the load suspension device transverse to the rail line (z-direction) should fail for whatever reason.

Preferably, the maximum absolute value of the risk-operation voltage is below a minimum travel voltage required to move the storage and retrieval unit. In this way, an even higher safety during operation of the storage and retrieval unit can be achieved.

The "root-mean-square value" is calculated by squaring and subsequent averaging, the "rectified value" by rectifying and subsequent averaging. In unipolar voltages, the "rectified value" is therefore simultaneously identical with the (arithmetic) "mean."

The storage and retrieval unit can comprise a drive motor for a travel movement of the storage and retrieval unit along the rail line (x-direction) and a drive motor for the positioning movement of a load suspension device transverse to the rail line (z-direction). The load suspension device can store a piece good in the storage rack and retrieve a piece good from the storage rack. The motion travel and effective range can be defined by the travel movement of the storage and retrieval unit along the rail line and positioning movement of the load suspension device transverse to the rail line.

Within the scope of the invention, the term "travel" primarily refers to the movement of the entire storage and retrieval unit, i.e. to an operation of traveling of the former on the rail line (x-direction). However, "travel" can also be applied to partial areas of the storage and retrieval unit, for example to the operations of exit and entry of a load suspension device (z-direction). If the load suspension device is disposed on a lifting frame, the term "travel" can also refer to a movement in the y-direction. Depending on the inertia of the moved unit and the drive power of the former, different minimum rectified values/minimum root-mean-square values apply. It should also be noted that the drive motor is not necessarily electrical, but the electric energy can first also be converted to another form, for example to pneumatic or hydraulic energy.

Other advantageous designs and further developments of the invention become apparent from the dependent claims as well as from the description in combination with the figures.

It is advantageous if the operation of disconnecting the current path is carried out by switching off a relay disposed within the current path to the drive motor. For example, the level of the voltage applied to the rail line/power-supply rail can be measured with the help of a comparator whose output is routed to the control coil of the relay. The relay can subsequently be switched off when the voltage measured is smaller than the threshold value associated with the risk situation.

It is also advantageous if the operation of disconnecting the current path is carried out by deactivating/switching off a driver whose output is connected to a control input of a transistor disposed on the power side within the current path. Often, the current path to the drive motor or the drive motors contains transistors, which are used to control the storage and retrieval unit. For example, the drive motors can be switched on and off as well as their RPMs and revolution direction be changed with their help. Advantageously, these transistors are used here to decommission the storage and retrieval unit in a risk situation, in this case by deactivating/switching off said driver, whereby also said transistors and therefore the drive motors connected to them are switched off. For example, the level of the voltage applied to the rail line/power-supply rail can be measured with the help of a comparator, whose output is routed to an input of said driver.

It is also advantageous if the operation of disconnecting the current path is carried out by blocking an RPM signal routed to the driver at the input side, wherein the driver is connected on the output side to a control input of a transistor disposed on the power side within the current path. In this variant, the RPM signal, which is generated during normal operation for controlling the drive motor or the drive motors, is blocked when a risk situation occurs. In this way, the target RPM "zero" is reported to said driver, which subsequently shuts down the drive motor connected with it or the drive motors connected with it. This can be carried out by deactivating/switching off a controller generating the RPM signal. For example, the level of the voltage applied to the rail line/power-supply rail can be measured with the help of a comparator, whose output is routed to an input of said controller. The operation of disconnecting the current path can, however, also be carried out by preventing the passing on of the RPM signal to the driver, for example by AND-coupling the RPM signal with the output of a comparator measuring the level of the voltage applied to the rail line/power-supply rail.

It is further advantageous if a brake acting on rail wheels of the storage and retrieval unit is actuated for application of a braking torque or holding torque upon disconnecting the current path. The brake can in particular be integrated into the current path of the drive motor and be configured as a self-holding brake. The operation of braking is automatically initiated upon cessation of an electrical supply. As the storage and retrieval unit in a risk situation, however, is supplied with the risk-operation voltage anyway, it is also possible to use a self-ventilating brake, which is actively actuated in a risk situation.

It is generally of advantage if the level of the normal-operation voltage is around 60V and/or the level of the risk-operation voltage around 24V and/or the voltage threshold value between 30V and 45V, and in particular around 32V. In this way, the voltage applied to the rail line/power-supply rail is sufficiently high both for the normal operation and for the risk operation, without the risk-operation voltage posing a risk for a person located within the effective range (workstream) and/or motion travel of the storage and retrieval unit. By fixing the voltage threshold value to the above-mentioned values, the current path is safely disconnected at the risk-operation voltage and safely closed at the normal-operation voltage.

It is moreover advantageous if the risk-operation voltage is applied to the rail line/power-supply rail with the same polarity as the normal-operation voltage. In this way, special switching measures in the storage and retrieval unit, such as, for example, providing a rectifier, will be obsolete. The motor control can therefore be kept simple.

It is also advantageous, however, if the risk-operation voltage is applied to the rail line/power-supply rail with a polarity opposite to the polarity of the normal-operation voltage. With a relevant wiring of the storage and retrieval unit which prevents the passing on of the opposite-polarity risk-operation voltage to the drive motor, the level of the risk-operation voltage per se is arbitrary. For example, a diode can be inserted into the current path to the drive motor, which is conductive for the normal-operation voltage but locks during the opposite-polarity risk-operation voltage. The proposed measures ensure that even components needing a comparatively high voltage, in particular a voltage averaging above the minimum travel voltage required to move the storage and retrieval unit, can be supplied during risk operation. Possibly, electrical energy stores (e.g. rechargeable batteries or capacitors) can be provided in the storage and retrieval unit in order to bridge the time required for the operation of reversing the polarity of the voltage.

It is favorable if the risk-operation voltage essentially has a direct component only, i.e. is essentially formed as a DC voltage. In this way, the drive control and the motor control can be kept particularly simple and robust. Failures and disruptions of the former can therefore largely be avoided.

It is also favorable if the risk-operation voltage essentially has an alternating component only. In particular when using a DC motor and a sufficiently high frequency of the risk-operation voltage compared with the inertia of the storage and retrieval unit, a starting of the storage and retrieval unit can be prevented even without special switching measures in the storage and retrieval unit. This is due to the fact that, after all, the risk-operation voltage, in this case, has on average no direct component, which would be required to move a DC motor.

It is favorable in addition if the risk-operation voltage has a direct component and an alternating component. Also in this case, the direct component of the risk-operation voltage can be kept so small that it is insufficient to move a DC motor, whereas the alternating component can be relatively large. In this way, also components needing a comparatively high voltage can be supplied during risk operation.

It is therefore further favorable if control signals are superimposed on the risk-operation voltage. For example, this control signal can be configured by a sinusoidal AC voltage or even as a digital signal. A sinusoidal alternating signal can be coupled into the operating current and decoupled from the latter once again in a particularly simple manner. For example, a transformer or a filter can be provided in the storage and retrieval unit to that end. With the help of a digital signal, even complex control commands can be transmitted to the storage and retrieval unit. In addition, it is largely immune to interference. For example, the frequency-hopping method or the spread-spectrum method can be used to that end in order to transmit control commands with high data security. For example, the control commands can be used to switch off drive motors (or only one drive motor) of the storage and retrieval unit.

In the above-mentioned context, it is finally also favorable if an AC-voltage component decoupled from the operating voltage (e.g. the entire alternating component or a specific frequency component of the former) in the storage and retrieval unit is wired to the control coil of a relay situated within the current path to a drive motor. Depending on whether the operating voltage applied to the storage and retrieval unit has an alternating component (in particular having a specific frequency), the relay can then be opened or closed and the drive motor thus be controlled. In particular, the alternating component can be decoupled and possibly subsequently be rectified via a transformer and/or a filter.

It should be noted in this context that the variants mentioned as part of the operating method of the invention and the resulting advantages refer in equal measure to the storage and retrieval unit presented and the automated rack storage system presented and vice versa.

It should furthermore be noted that the measures presented for switching off the drive motor or the drive motors and/or for shutting down the storage and retrieval unit can be used individually or in any combination, whereby the safety in a risk situation is further increased.

BRIEF DESCRIPTION OF THE DRAWINGS

For the purpose of a better understanding of the invention, the latter will be elucidated in more detail by means of the figures below.

DETAILED DESCRIPTION OF THE PREFERRED EMBODIMENTS

First of all, it is to be noted that, in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, and these specifications of location are to be analogously transferred to the new position. Furthermore, also individual features or feature combinations from the different exemplary embodiments shown and described may represent independent inventive solutions or solutions in accordance with the invention. Furthermore, it should be noted that the voltage values specified can contain a deviation of ±10% from a reference value.

Figure 1:
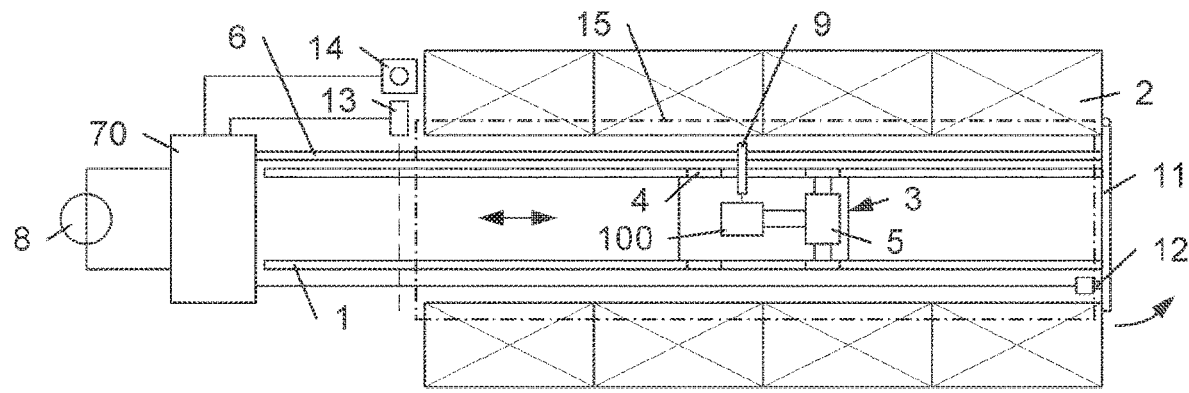
FIG. 1 shows an exemplary and schematic depiction of an automated rack storage system with a storage and retrieval unit moving within it in a plan view.

FIG. 1 shows an automated rack storage system with a rail line 1, at least one storage rack 2 disposed along the rail line 1 and a storage and retrieval unit 3 movable on the rail line 1. The automated rack storage system can also comprise several storage and retrieval units 3. The storage and retrieval unit 3 comprises rail wheels 4 and a drive motor 5. Moreover, the exemplary storage and retrieval unit 3 comprises a support frame to which the rail wheels 4 are attached and onto which the drive motor 5 for the travel drive is mounted, a load suspension device for storing piece goods in the storage rack 2 and for retrieving piece goods from the storage rack 2, as well as a drive motor or several drive motors for the load suspension device. The load suspension device can for example be configured as a lifting fork and in particular also comprise conveyor belts or conveyor rollers for moving the piece goods. In addition, the exemplary storage and retrieval unit 3 comprises a control unit, which is connected to a superordinate, central control (not depicted) of the rack storage system.

Furthermore, the automated rack storage system comprises a power-supply rail 6 and a drive control 70 electrically connected to it, which drive control 70 is, in turn, connected to a power supply/voltage source 8. In the example shown, the supply voltage is collected from the power-supply rail 6 via a sliding contact/current collector 9 and passed on to a motor control 100, which controls the drive motor 5 for the travel drive and, provided that a drive motor 5 is also provided for the load suspension device, controls the drive motor 5 for the load suspension device. Also, the motor control 100 can take over further control tasks, such as, for example, the operations of storing into and retrieving from the storage rack 2 piece goods (for example packing units, containers, trays, and such like). The motor control 100 can be part of the control unit of the storage and retrieval unit 3, which is connected to a superordinate, central control of the rack storage system.

In the FIG. 1, the power-supply rail 6 is arranged next to the rail line 1, of course the power-supply rail 6 can also be arranged within the rail line 1. In addition, it is conceivable that the electric energy is supplied to the storage and retrieval unit 3 directly via the rail line 1 and/or the rail wheels 4.

The right-hand end of the rack aisle is in this example closed off with a door 11, whose closed state is monitored using a switch 12 connected to the drive control 70. Finally, the automated rack storage system shown comprises, by way of example, also a light barrier 13 as well as a push button 14, which are connected to the drive control 70.

The functioning of the automated rack storage system shown in the FIG. 1 is as follows:

During normal operation, the storage and retrieval unit 3 receives commands from a superordinate control not depicted to pick up piece goods from a handover station and storing them in the storage rack 2 or retrieving piece goods from the latter and dispense them at a handover station. A handover station can be provided at one end of the rail line 1 or be arranged between the ends of the rail line 1 in the storage rack 2. A vertical conveyor device can be provided in the area of the handover station, so that several rail lines 1 can be disposed above one another and thus form a store with several storage levels. According to this embodiment, storage and retrieval units 3 are provided in some of the storage levels or in each storage level. It is also conceivable that a horizontal conveyor device (e.g. conveyor belts or conveyor rollers) is disposed at the handover station and/or at the vertical conveyor device in order to convey the piece goods to and from the latter accordingly. It is also conceivable that an order-picking workplace is disposed at the handover station and/or at the vertical conveyor device.

During normal operation, the storage and retrieval unit 3 operates in a fully automated manner. To that end, a normal-operation voltage applied to the rail line 1/power-supply rail 6 during normal operation is passed on, via the motor control 100 of the storage and retrieval unit 3, to the drive motor 5 for the travel drive connected to the motor control 100 and/or to the drive motor 5 for the load suspension device connected to the motor control 100, and/or this drive motor or these drive motors 5 is controlled/regulated by the motor control 100 in a manner known in principle.

In certain situations, however, the intervention of an operator may be required, for example when piece goods become wedged, the storage and retrieval unit 3 is defective or the conveyance flow is otherwise interrupted. As the storage and retrieval unit 3 moves at a relatively high speed, the operator must be protected whenever s/he enters the rack aisle and/or the rail line 1. For this purpose, s/he pushes the push button 14, whereupon the storage and retrieval unit 3 is shut down in a controlled manner. Additionally, the entrance to the rack aisle can also be monitored by the light barrier 13. An additional protection is provided by the door 11 located at the right-hand end of the rack aisle, which can be monitored using the switch 12. This results in a protection zone 15. Additionally, also a protection fence can be disposed around the storage racks 2.

When the entry into the rack aisle by a person is detected, be it from the left-hand side or from the right-hand side, the storage and retrieval unit 3 is automatically decommissioned, i.e. even without the push button 14 having to be pushed explicitly. In the FIG. 1, both sides of the rack aisle are monitored. Evidently, it is also possible to equip only one of the sides of the rack aisle with a light barrier 13 and/or a push button 14 and/or a door 11 having a switch 12. It is further conceivable that, alternatively or additionally, other safeguards are taken, such as, for example, the operation of actuating barriers or monitoring using other sensors, for example proximity sensors or video cameras.

The drive control 70 then sets the rail line 1/power-supply rail 6 to a risk-operation voltage, which is below the normal-operation voltage, when a risk posed by the storage and retrieval unit 3 is detected and there is thus a risk situation, i.e. when the push button 14 is pushed or the light barrier 13 and/or the switch 12 reports an entry into the rack aisle.

In the storage and retrieval unit 3, the level of the voltage applied to the rail line 1/power-supply rail 6 is (continuously) measured, and a current path between the rail line 1/power-supply rail 6 and a drive motor 5 of the storage and retrieval unit 3 is disconnected in the storage and retrieval unit 3 when the voltage measured is below a threshold value associated with the risk situation. This means that the voltage applied to the rail line 1/power-supply rail 6 is only passed on to a drive motor 5 of the storage and retrieval unit 3 if the voltage measured is smaller than said threshold value. The operation of disconnecting the current path immediately results in a standstill of the storage and retrieval unit 3. The stopping operation can be shortened by a brake actuated by a drop of the voltage applied to the rail line 1/power-supply rail 6 and/or by an operation of disconnecting said current path. For example, a self-holding brake can be used, which brakes automatically upon an operation of disconnecting an energy supply.

The proposed measures ensure that a set of control electronics of the storage and retrieval unit 3 can still be electrically supplied, even though the storage and retrieval unit 3 is unable to move due to the disconnected current path.

Generally, the risk-operation voltage can be rated in such a way that it is, in principle, sufficiently high to move the storage and retrieval unit 3. In other words, the rectified value/root-mean-square value of the risk-operation voltage is above a minimum rectified value/minimum root-mean-square value required to move the storage and retrieval unit 3. This is possible because the current path for driving the storage and retrieval unit 3 is, after all, disconnected.

However, it is also conceivable that the rectified value/root-mean-square value of the risk-operation voltage is below a minimum rectified value/minimum root-mean-square value required to move the storage and retrieval unit 3 but above zero. These measures ensure that the safety of the operating staff can be further increased, as the storage and retrieval unit 3 stops even if the detection device disconnecting the current path at least to one drive motor 5 of the storage and retrieval unit 3 in a risk situation should fail. Due to the inertia of the storage and retrieval unit 3, it is sufficient, as a rule, if the rectified value/root-mean-square value of the risk-operation voltage is below a rectified value/root-mean-square value of the minimum travel voltage required to move the storage and retrieval unit 3. For an even higher safety, however, it can also be provided that the maximum absolute value of the risk-operation voltage is below the minimum travel voltage.

Figure 3:
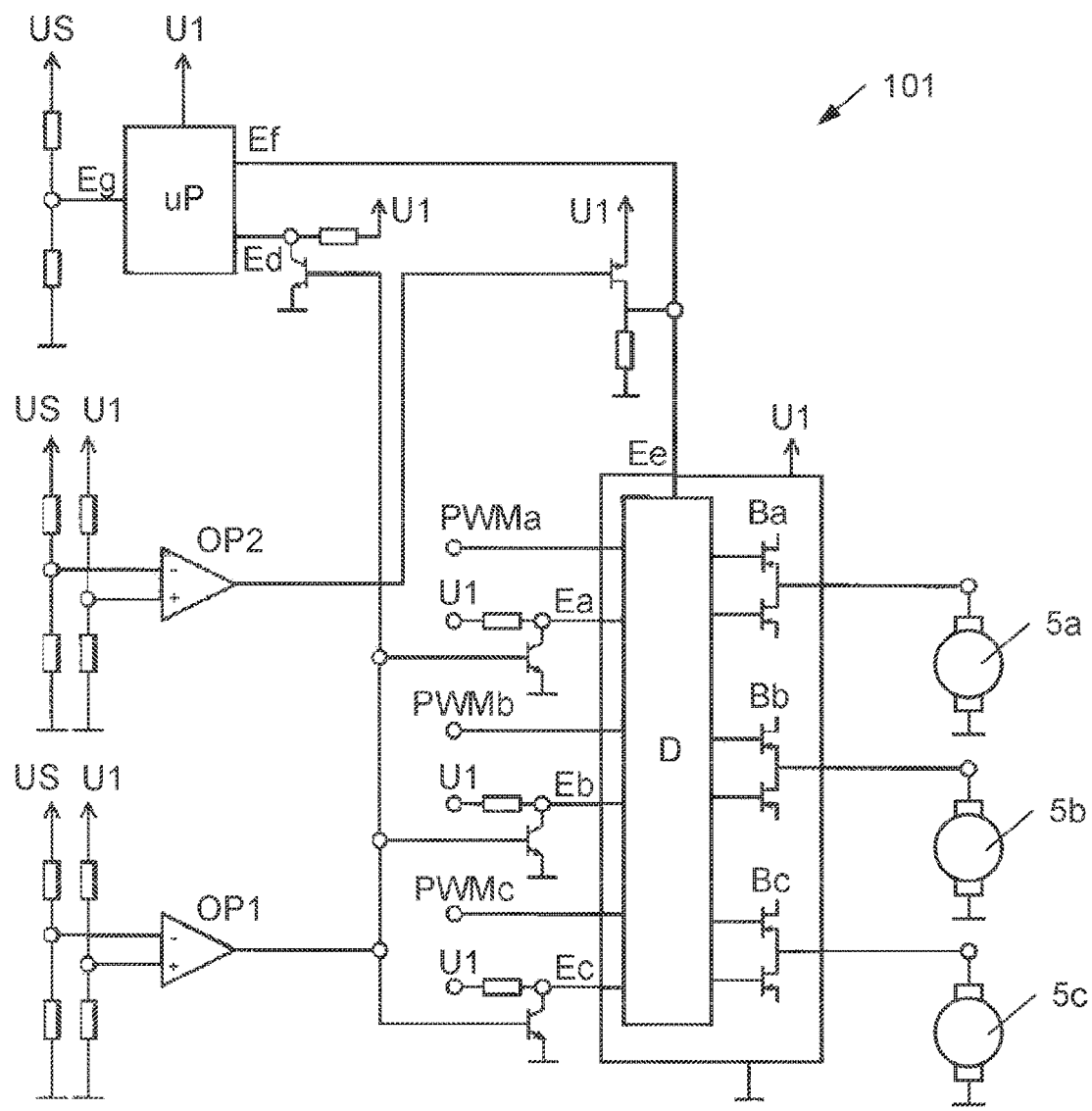
FIG. 3 shows a schematic depiction of a circuit diagram of an exemplary (mobile) motor control.

The FIG. 3 shows an example of a motor control 101 disposed in the storage and retrieval unit 3 which supplies, in this case, three drive motors, namely one drive motor 5*a* for a travel movement in the x-direction, one drive motor 5*b* for a width adjustment of a load suspension device as well as one drive motor 5*c* for storing piece goods into and retrieving them from storage.

The motor control 101 comprises several half bridges Ba . . . Bc having transistors, a driver circuit D for the half bridges Ba . . . Bc, a microprocessor uP for controlling the storage and retrieval unit 3 and in particular for generating an RPM signal PWMa . . . PWMc for the drive motors 5*a* . . . 5*c*, a first comparator OP1 having upstream voltage dividers and a second comparator OP2 having upstream voltage dividers.

A functioning of the motor control 101 is as follows:

During normal operation, RPM signals PWMa . . . PWMc for the drive motors 5*a* . . . 5*c* are routed to the inputs of the driver circuit D, which are transformed by the driver circuit D into relevant control signals for the half bridges Ba . . . Bc connected on the output side. During normal operation, the measuring voltage routed to the first comparator OP1, which derives from the voltage US applied to the power-supply rail 6, is larger than the reference voltage derived from a supply voltage U1 of the motor control 101. The output of the comparator OP1 therefore assumes a low potential, whereby the transistors connected on the output side lock, and a high potential is applied to the inputs Ea . . . Ec of the driver circuit D and/or to the input Ed of the microprocessor uP. This high potential therefore indicates that the normal-operation voltage is applied to the power-supply rail 6. The RPM signals PWMa . . . PWMc and the inputs Ea . . . Ec are AND-coupled in the driver circuit D, so that the RPM signals PWMa . . . PWMc are passed on to the internal circuits of the driver circuit D, which generates the signals for the half bridges Ba . . . Bc. In this way, it is indicated also to the microprocessor uP that the normal-operation voltage is applied to the power-supply rail 6.

If the risk-operation voltage is then applied to the power-supply rail 6, the output of the first comparator OP1 assumes a high potential, wherein the transistors connected on the output side are driven to full output and generate a low potential at the inputs Ea . . . Ec of the driver circuit D and/or at the input Ed of the microprocessor uP. This low potential therefore indicates that the risk-operation voltage is applied to the power-supply rail 6. In the driver circuit D the RPM signals PWMa . . . PWMc, which are AND-coupled to the inputs Ea . . . Ec, are therefore no longer passed on to the internal circuits of the driver circuit D and/or the RPM signal zero is therefore routed to the internal circuits. The drive motors 5*a* . . . 5*c* are therefore stopped.

Additionally or alternatively, the low voltage signal can have the effect at the input Ed in the microprocessor uP that no RPM signal PWMa . . . PWMc and/or the RPM signal PWMa . . . PWMc zero is generated and routed to the driver circuit D. This, too, causes a stopping of the drive motors 5*a* . . . 5*c*.

Another option for stopping the drive motors 5*a* . . . 5*c* is to deactivate and/or switch off the driver circuit D per se. In the motor control 101, this is caused by the second comparator OP2. During normal operation, the measuring voltage routed to the second comparator OP2, which derives from the voltage US applied to the power-supply rail 6, is larger than the reference voltage derived from a supply voltage U1. The output of the second comparator OP2 therefore assumes a low potential, whereby the transistor connected on the output side is driven to full output and a high potential is applied to the input Ee of the driver circuit D and/or also to the input Ef of the microprocessor uP. This high potential therefore indicates that the normal-operation voltage is applied to the power-supply rail 6.

If the risk-operation voltage is then applied to the power-supply rail 6, the output of the second comparator OP2 assumes a high potential, wherein the transistor connected on the output side locks and generates a low potential at the input Ee of the driver circuit D and/or also at the input Ef of the microprocessor uP. This low potential therefore indicates that the risk-operation voltage is applied to the power-supply rail 6. The driver circuit D is thereby deactivated and/or switched off. In the microprocessor uP, too, this low potential can have the effect that no RPM signal PWMa . . . PWMc and/or the RPM signal PWMa . . . PWMc zero is generated and routed to the driver circuit D.

As another option for stopping the drive motors 5*a* . . . 5*c*, a measuring voltage is routed also to the microprocessor uP, which measuring voltage derives from the voltage US applied to the power-supply rail 6. If the normal-operation voltage is applied to the power-supply rail 6, a high voltage signal is applied to the input Eg of the microprocessor uP. If the risk-operation voltage is applied to the power-supply rail 6, a low voltage signal is applied to the input Eg of the microprocessor uP. This voltage signal can also be used to generate the RPM signal PWMa . . . PWMc or not and/or to generate the RPM signal PWMa . . . PWMc zero.

In the FIG. 3, the RPM signals PWMa . . . PWMc can be pulse-width-modulated signals. Of course, it is also conceivable to use other signals. Moreover, the output signals of the comparators OP1, OP2 serving as a detection device can also be affected by a hysteresis, so that the output signal does not often change states but remains stable when an input signal is very close to the voltage threshold value.

An embodiment without width adjustment of a load suspension device, so that only two drive motors 5*a*, 5*c* are provided, would also be possible. In this case, the level of the voltage applied to the rail line 1/power-supply rail 6 is (continuously) measured in the storage and retrieval unit 3, and a current path between the rail line 1/power-supply rail 6 and a drive motor 5*a* for the travel movement along the rail line 1 and the drive motor 5*c* for the positioning movement of the load suspension device transverse to the rail line 1 is disconnected in the storage and retrieval unit 3 when the voltage measured is below a threshold value associated with the risk situation.

The proposed measures can be applied individually or in any combination. If several measures are applied jointly, the redundancy thus achieved can increase the safety for a person entering the rack aisle.

Figure 2:
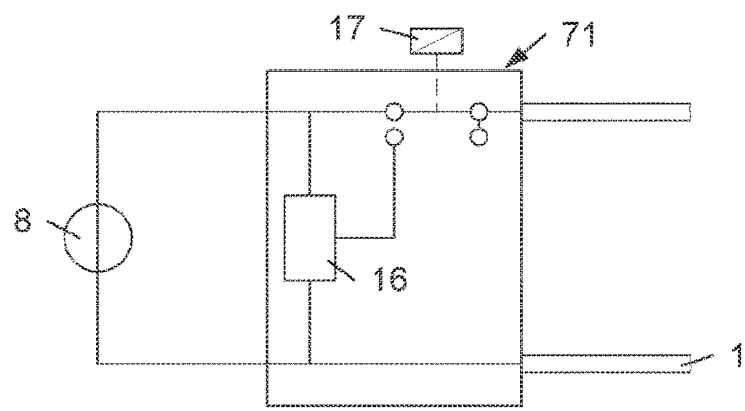
FIG. 2 shows an exemplary and schematic depiction of a (stationary) drive control for lowering the operating voltage in a risk situation.

The FIG. 2 shows a specific example of a drive control 71 comprising a voltage converter 16 and a change-over switch 17. The voltage converter 16 converts the voltage supplied by the power supply/voltage source 8 to a low level, for example from 60V to 24V. With the help of the change-over switch 17, the voltage supplied by the voltage source 8 can be wired directly to the power-supply rail 6 (see depicted state), or there is a changeover to the lower voltage level.

The voltage level of the risk-operation voltage can generally be selected in such a way that it is below the start voltage and the storage and retrieval unit 3 standing still can no longer start, or it can even be below the minimum travel voltage, so that even a moving storage and retrieval unit 3 will stop. For example, the normal-operation voltage can be smaller than or equal to 100V and be in particular 60V, 48V or 24V, whereas the risk-operation voltage can be, for example, smaller than or equal to 24V and is in particular 12V or 5V, which is typically sufficient for supplying electronic components. Accordingly, the voltage threshold value can be fixed to a range between 30V and 45V, in particular to 32V, 20V or 10V. It would also be conceivable that only important circuits are designed for the operation by the risk-operation voltage while other circuits, including the drive motor 5, 5a . . . 5c, are decommissioned. For example, it can be provided that the position sensor and communication components as well as sensors keep functioning unrestrictedly even when only the risk-operation voltage is applied, so that a smooth resumption of the normal operation after a risk operation is ensured. By fixing the voltage threshold value to about 32V, 20V or 10V, the current path is safely disconnected at the risk-operation voltage and safely closed at the normal-operation voltage.

In the example depicted in FIG. 2, the risk-operation voltage has the same polarity as the normal-operation voltage. It is also conceivable, however, that the risk-operation voltage is applied to the power-supply rail 6 with a polarity opposite to the polarity of the normal-operation voltage.

Figure 4:
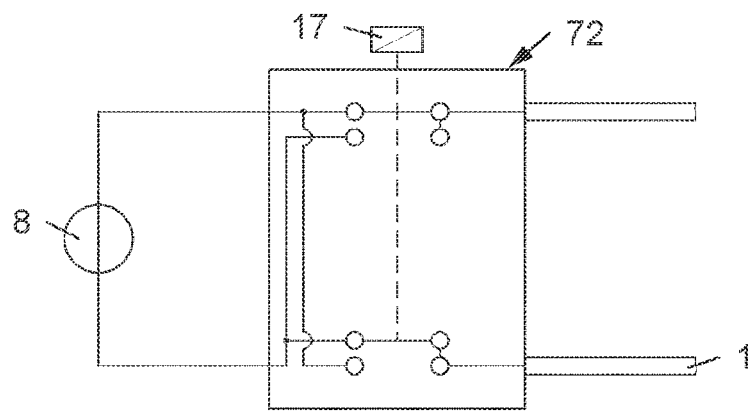
FIG. 4 shows an exemplary and schematic depiction of a drive control for reversing the polarity of the operating voltage in a risk situation.

In this context, FIG. 4 shows an example of a drive control 72, in which the voltage supplied by the voltage source 8 can be directly wired to the power-supply rail 6, though with different polarity depending on the position of the change-over switch 17. In order to achieve the desired purpose, namely to still supply important components with electrical voltage even while the storage and retrieval unit 3 is decommissioned, the circuit depicted in FIG. 3 can be provided in the storage and retrieval unit 3.

Figure 5:
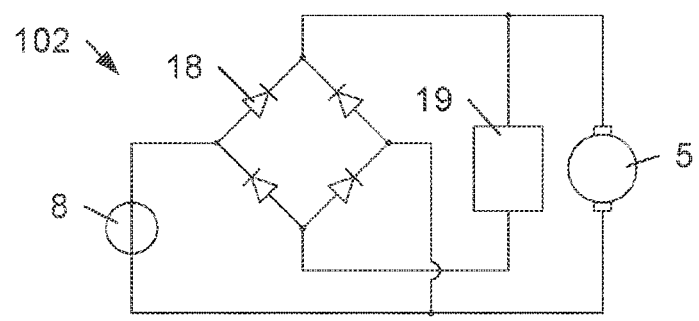
FIG. 5 shows an exemplary and schematic depiction of a motor control for operating the storage and retrieval unit with a reverse-polarity risk-operation voltage.

The FIG. 5 shows a detail from an exemplary motor control 102, in which the drive motor 5 is connected with the voltage source 8 via a diode 18. The diode 18 is at the same time part of a full-wave bridge rectifier supplying the circuit 19. The circuit 19 can contain important components such as, for example, a position sensor and communication components, as well as the circuits depicted in FIG. 3. During normal operation (see the switching position of the change-over switch 17 depicted in the FIG. 4), the diode 18 is conductive and the drive motor 5 is supplied with electricity. Also the circuit 19 is supplied with electricity via the rectifier. When the polarity of the voltage on the power-supply rail 6 is reversed, the diode 18 locks, whereby the drive motor 5 is no longer supplied with electricity. However, due to the rectifier the circuit 19 will still be supplied with electric energy even with reversed polarity. In this context, the FIG. 5 serves to illustrate merely the fundamental principle. Evidently, downstream of the diode 18 a change-over switch for the drive motor 5 can be disposed with the help of which the direction of rotation of the drive motor 5 can be reversed when the diode 18 is conductive. The proposed measure can be applied in addition to the measures disclosed in the FIG. 3 in order to further increase the safety of a person upon entering the rack aisle.

In the combination depicted in the FIGS. 4 and 5, the risk-operation voltage can be designed as DC voltage (i.e. essentially having a direct component only), wherein the DC voltage is applied to the power-supply rail 6 with a different polarity each.

However, it would also be conceivable that the normal-operation voltage is a DC voltage and the risk-operation voltage comprises essentially an alternating component only, i.e. is an AC voltage. In this case, too, the circuit 19 would be supplied with electric energy in both operating modes, whereas the drive motor 5 is supplied with electric energy only at every second half-wave of the AC voltage. On average, the voltage therefore drops to a lower value. It would also be conceivable to connect the drive motor 5, which is presumed for the purpose of the following considerations to be a DC-voltage motor, to the voltage source 8 directly, i.e. without insertion of the diode 18. As a result of the risk-operation voltage comprising essentially no direct component, the drive motor 5 will simply stop running due to its inertia when the frequency of the risk-operation voltage is sufficiently high, whereas the circuit 19 will keep being supplied with electric energy.

It would finally also be conceivable that an additional fuse is integrated in the current path of the drive control 72 which is active when the risk-operation voltage is applied, which fuse is designed for the current for supplying the storage and retrieval unit 3 in a risk situation but not for the motor current of the drive motor 5. In this way, the storage and retrieval unit 3 can be prevented from beginning to move when the diode 18 breaks down and becomes conductive. In this case, the above-mentioned fuse in the drive control 72 would blow and prevent a movement of the storage and retrieval unit 3.

Figure 6:
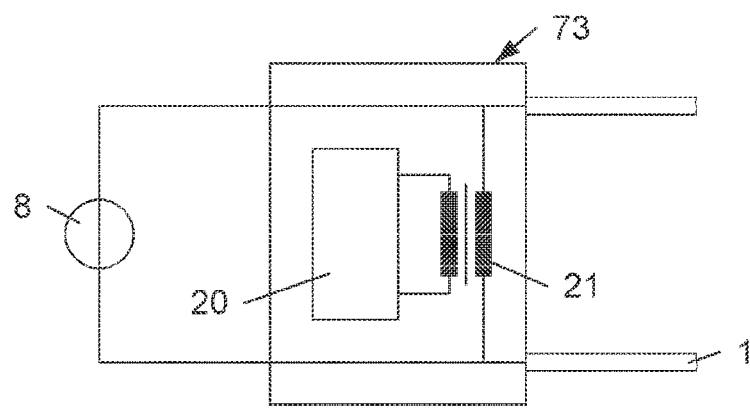
FIG. 6 shows an exemplary and schematic depiction of a drive control for modulating an alternating signal upon the operating voltage.
Figure 7:
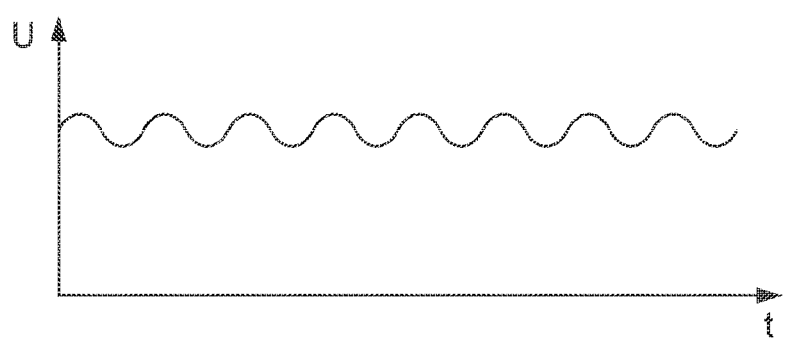
FIG. 7 shows an exemplary operating voltage with a direct component and a sinusoidal alternating component.
Figure 8:
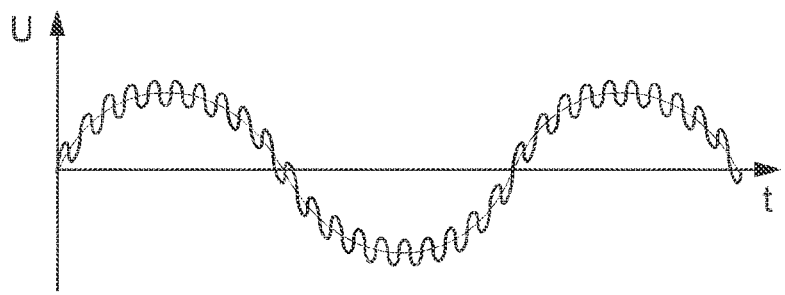
FIG. 8 shows an exemplary operating voltage without a direct component with a sinusoidal alternating component modulated upon a sinusoidal carrier wave.
Figure 9:
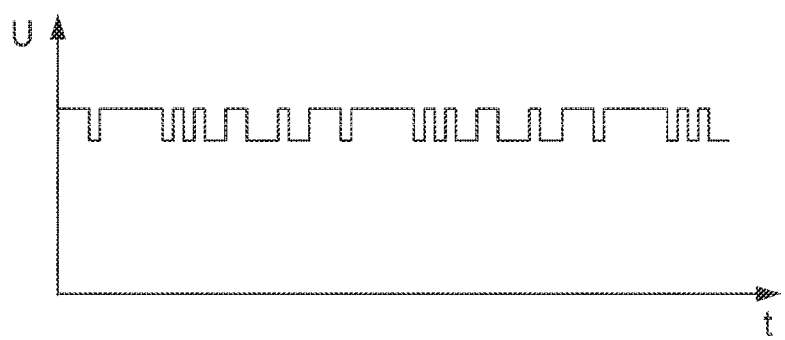
FIG. 9 shows an exemplary operating voltage with a direct component and a digital signal modulated upon it.

It would also be conceivable that a control signal is superimposed on the risk-operation voltage. In this context, the FIG. 6 shows an example of a drive control 73 in which a signal can be modulated upon the voltage of the voltage source 8 with the help of a modulator 20 and a coupling transformer 21. For example, the modulator 20 can generate a sinus signal, which is modulated with the help of the coupling transformer 21 upon a DC voltage supplied by the voltage source 8. In this context, FIG. 7 shows an example of the resulting voltage. It would also be conceivable that the voltage source 8 supplies an AC voltage, upon which an AC voltage with a higher frequency is modulated. In this context, FIG. 8 shows an example of the resulting voltage. Furthermore, it would also be conceivable that the modulator 20 generates a digital code, which is modulated upon a DC voltage supplied by the voltage source 8. In this context, FIG. 9 shows an example of the resulting voltage. Analog to the FIG. 7 it would also be conceivable that the digital signal is modulated upon an AC voltage.

In the examples shown, the modulated sinus signal has a constant frequency and a constant amplitude. This is, of course, not mandatory. It would also be conceivable that the frequency and/or amplitude of the modulated sinus signal is variable, i.e. the sinus signal is frequency- and/or amplitude-modulated. In addition, signals can generally be superimposed in a unipolar or bipolar manner, i.e. having either only one polarity or both, starting from a fundamental voltage.

Figure 10:
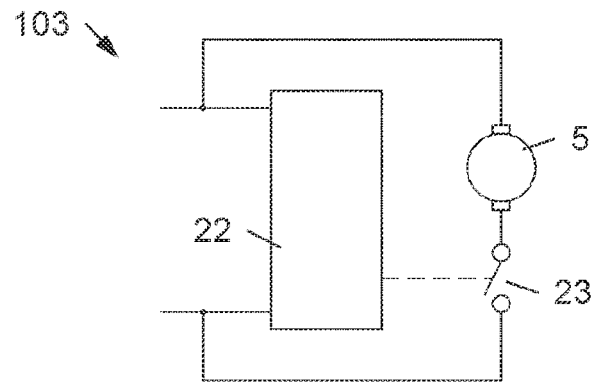
FIG. 10 shows an exemplary and schematic depiction of a motor control for decoding an alternating signal modulated upon it and FIG. 11 shows an exemplary and schematic depiction of a motor control, in which a relay in the motor circuit is held in a switching state by an alternating component in the operating voltage.

These components contained in the supply voltage for the storage and retrieval unit 3 can then be used to shut down the storage and retrieval unit 3 in a risk situation. In this context, the FIG. 10 shows a detail of an exemplary motor control 103 comprising a decoder 22 and a switch 23 in the motor circuit controlled by the decoder 22.

In a first example, it is assumed that the normal-operation voltage contains the digital signal predefined in FIG. 9 but that the risk-operation voltage does not contain this first digital signal. This means that the drive control 73 modulates the digital signal upon the supply voltage only when there is no risk. Accordingly, the decoder 22 keeps the switch 23 closed so long as it can ascertain the agreed digital signal in the supply voltage. Once it can no longer detect the latter, there is a risk by the storage and retrieval unit 3 and the switch 23 is opened accordingly.

However, it would also be conceivable that the risk-operation voltage contains the predefined digital signal and the normal-operation voltage does not contain this digital signal. The risk-operation voltage therefore has a direct component and an alternating component. In this case, the relations described above are merely reversed, so that the switch 23 remains open so long as the decoder 22 can ascertain the agreed digital signal in the supply voltage.

Finally, it would also be conceivable that the normal-operation voltage contains a predefined first digital signal and the risk-operation voltage contains a predefined second, different digital signal. In this case, the switch 23 remains open so long as the decoder 22 can ascertain the agreed second digital signal in the supply voltage. If the decoder 22, in contrast, ascertains the first digital signal in the supply voltage, the switch 23 will be closed.

Evidently, the safeguard depicted above does not necessarily require a digital signal to be modulated, but it can be sinusoidal alternating signals which are modulated (see FIGS. 7 and 8). The latter can be detected with the help of a digital circuit, but in principle also an active or passive filter can be provided as a decoder 22, or the decoder 22 can contain such active or passive filter.

Generally, the alternating signal need not be constantly modulated and/or constantly monitored during normal operation and/or during hazardous risk operation. It is also conceivable that the operations of modulating and monitoring are executed only periodically.

Figure 11:
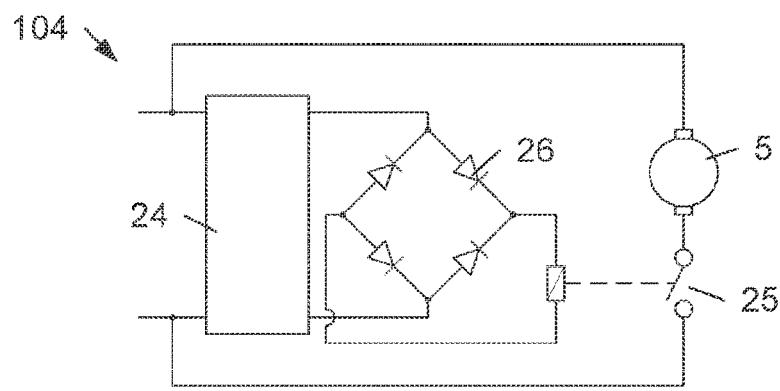

FIG. 11 shows an example of a motor control 104, in which an AC-voltage component of the operating voltage is decoupled with the help of a decoupler 24 in the storage and retrieval unit 3 and wired via the rectifier 26 to the control coil of a relay 25 for disconnecting the operating voltage from the drive motor 5. The latter is thereby kept in a switching state. For example, an alternating component contained in the normal-operation voltage would result in a voltage being applied to the control coil of the relay 25 and keeping it closed. When the alternating component disappears upon switching to the risk-operation voltage, the relay 25 is released and the drive motor 5 is disconnected from the operating voltage. In this case, the relay 25 is therefore configured as an NO contact. However, matters could be reversed and the alternating component could be modulated upon the risk-operation voltage, so that the relay 25 is configured as an NC contact.

For example, the decoupler 24 could be configured as a transformer and the entire alternating component of the operating voltage thus decoupled and routed via the optional rectifier 26 to the control coil of the relay 25. It would also be conceivable that the decoupler is configured as a filter and therefore only a specific frequency component is decoupled from the operating voltage. This is in particular of advantage whenever both the normal-operation voltage and the risk-operation voltage have an alternating component. If the relay 25 is configured as an NO contact, the filter 24 is designed for the frequency of the alternating component contained in the normal-operation voltage. If the relay 25, in contrast, is configured as an NC contact, the filter 24 is designed for the frequency of the alternating component contained in the risk-operation voltage. Evidently, the transformer and filter can also be combined.

The exemplary embodiments show possible embodiment variants of drive controls 70 . . . 73 and motor controls 100 . . . 104, and it should be noted in this respect that the invention is not restricted to these particular depicted embodiment variants of it, but that rather a possibility of variants based on the technical teaching by means of the invention at issue lies within the ability of the person skilled in the art in this technical field.

In particular, the depicted variants can be combined as desired. For example, the motor control 101 depicted in FIG. 3 can be combined in full or in parts with one or several of the safeguards depicted in the FIGS. 2 and 4-11. Accordingly, an operation of disconnecting the current path to a drive motor 5, 5a . . . 5c of the storage and retrieval unit 3 can be combined with the modulation of an alternating signal/digital signal upon the normal-operation voltage/risk-operation voltage. It would also be conceivable to additionally reverse the polarity of the risk-operation voltage in relation to the normal-operation voltage or combine the variant depicted in the FIG. 10 and the variant depicted in the FIG. 11. In this case, the decoder 22 could analyze the operating voltage for a digital code contained in it while the decoupler 24 decouples merely the alternating component caused by the digital signal from the operating voltage and thus keeps the relay 25 open and/or closed. In this way, a risk state is detected in two different manners.

The combination of several safeguards ensures that the security of the operation of the storage and retrieval unit 3 is increased compared with an individual measure. In particular, it is of advantage if the drive motor 5, 5a . . . 5c is supplied with the normal-operation voltage only when all or at least the majority of said units come to the same decision. In this context, it is particularly advantageous if the units have different structures or come from different manufacturers.

In completely general terms, it is of advantage if the threshold value for disconnecting the current path to the drive motor 5, 5a . . . 5c, in particular the drive motor 5a for the travel movement along the rail line 1 or the drive motor 5b for the width adjustment of the load suspension device and the drive motor 5c for storing piece goods into and retrieving them from storage, is below the normal-operation voltage but higher than or equal to the risk-operation voltage. In this way, the current path is safely disconnected at the risk-operation voltage and safely closed at the normal-operation voltage. For the various proposed measures, different or identical voltage threshold values can be provided for disconnecting the current path.

In order to further increase the safety, it can be provided that a brake acting on rail wheels 4 of the storage and retrieval unit 3 is actuated upon disconnecting the current path. The brake can in particular be integrated into the current path of the drive motor 5, 5a . . . 5c and be configured as a self-holding brake. The operation of braking is then automatically initiated upon cessation of an electrical supply. As the storage and retrieval unit 3 in the risk situation, however, is supplied with the risk-operation voltage anyway, it is also possible to use a self-ventilating brake.

Generally, the embodiments have been elucidated by means of a DC motor. However, the invention is of course applicable in an unrestricted manner also to AC motors and three-phase motors.

It should also be noted in this context that the power-supply rail 6 can comprise several conductors which are insulated from one another, in particular one each for the positive and negative potentials and/or masses (DC voltage) and/or one each per phase and, if applicable, for zero conductors (AC voltage).

Furthermore, the storage and retrieval unit 3 was depicted in the examples as movable only in a horizontal direction. However, this is not mandatory. The storage and retrieval unit 3 can also move vertically, obliquely, as well as horizontally and vertically. The latter is, for example, formed by a horizontally-shiftable elevator with a lifting fork.

Moreover, it should be noted that the (mechanical) switches 17, 23 and 25 used in the figures for reasons of easier understanding can be replaced by equivalent electronic switches. For example, in FIG. 10 transistors, in particular FETs or IGBTs, can be used instead of the switch 18.

In particular, it should be noted that the depicted controls and the automated rack storage system may in reality also include more or fewer parts than depicted and are sometimes depicted in a strongly simplified manner.

Finally, as a matter of form, it should be noted that for ease of understanding of the structure, the depicted drive controls 70 . . . 73, motor controls 100 . . . 104 and the automated rack storage system of FIG. 1 as well as their components are moreover partially not depicted to scale and/or are enlarged and/or are reduced in size.

The object underlying the independent inventive solutions may be gathered from the description.

LIST OF REFERENCE NUMBERS 1 rail line
2 storage rack
3 storage and retrieval unit
4 wheel
5a . . . 5c drive motor
6 power-supply rail
70 . . . 73 (stationary) drive control
8 voltage source/energy supply
9 sliding contact
100 . . . 104 (mobile) motor control
11 door
12 switch
13 light barrier
14 push button
15 protection zone
16 voltage converter
17 change-over switch
18 diode
19 electronic circuit
20 modulator
21 transformer
22 decoder/demodulator
23 switch
24 decoupler
25 relay
26 rectifier Ba . . . Bc half bridge
D driver circuit
Ea . . . Eg input
OP1 first comparator
OP2 second comparator
PWMa . . . PWMc RPM signal
t time
U voltage
U1 supply voltage motor control
US voltage at power-supply rail/rail line

The invention claimed is:

1. A method for operating a storage and retrieval unit movable on a rail line in an automated rack storage system having at least one storage rack disposed along the rail line, the method comprising:
supplying the storage and retrieval unit with electric energy via a power supply electrically connected to at least one of the rail line and a power-supply rail;
using the storage and retrieval unit to store piece goods into storage in the storage rack or to retrieve piece goods from the storage rack;
setting in a normal operation at least one of the rail line and the power-supply rail to a normal-operation voltage when no risk posed by the storage and retrieval unit is detected;
setting in a risk situation at least one of the rail line and the power-supply rail to a risk-operation voltage below the normal-operation voltage and sufficiently high to move the storage and retrieval unit when a risk posed by the storage and retrieval unit is detected;
measuring a level of a voltage applied to at least one of the rail line and the power-supply rail in the storage and retrieval unit; and
disconnecting, in the storage and retrieval unit, a current path between at least one of the rail line and the power-supply rail and a drive motor of the storage and retrieval unit when the voltage measured falls below a threshold value associated with the risk situation.

2. The method according to claim 1, wherein the threshold value is below the normal-operation voltage but is higher than or equal to the risk-operation voltage.

3. The method according to claim 1, wherein the disconnection of the current path is carried out by switching off a relay disposed within the current path.

4. The method according to claim 1, wherein the disconnection of the current path is carried out by deactivating or switching off a driver, which is connected on the output side to a control input of a transistor disposed on the power side within the current path.

5. The method according to claim 1, wherein the disconnection of the current path is carried out by blocking an RPM signal routed to the driver at the input side, wherein the driver is connected on the output side to a control input of a transistor disposed on the power side within the current path.

6. The method according to claim 5, wherein the disconnection of the current path is carried out by deactivating or switching off a controller generating the RPM signal, or by preventing the passing on of the RPM signal to the driver.

7. The method according to claim 1, wherein a brake acting on rail wheels of the storage and retrieval unit is actuated upon disconnecting the current path.

8. The method according to claim 1, wherein the level of the normal-operation voltage is around 60V or the level of the risk-operation voltage is around 24V or the voltage threshold value is between 30V and 45V.

9. The method according to claim 1, wherein the risk-operation voltage is applied to at least one of the rail line and the power-supply rail with the same polarity as the normal-operation voltage or with a polarity opposite to the polarity of the normal-operation voltage.

10. The method according to claim 1, wherein the risk-operation voltage:
essentially has a direct component only;
essentially has an alternating component only; or
has one direct component and one alternating component.

11. An automated rack storage system, comprising:
a rail line;
at least one storage rack disposed along the rail line;
a storage and retrieval unit movable on the rail line and configured for storing piece goods into the storage rack and retrieving piece goods from the storage rack, the storage and retrieval unit having:
several rail wheels;
a motor control which is electrically connected to at least one rail wheel or a current collector configured for electrical connection of a power-supply rail;
at least one drive motor connected to the motor control; and
a detection device configured to measure a level of a voltage applied to the at least one rail wheel or the current collector and to disconnect a current path between the at least one rail wheel or the current collector and a drive motor of the storage and retrieval unit when the voltage measured is below a threshold value associated with a risk situation;
a power supply electrically connected to at least one of the rail line and a power-supply rail, which is in contact with the storage and retrieval unit; and
a drive control adapted to detect a risk posed by the storage and retrieval unit and to set the at least one of the rail line and the power-supply rail to a normal-operation voltage in a normal operation when there is no risk and to a risk-operation voltage in a risk situation,
wherein the risk-operation voltage is sufficiently high to move the storage and retrieval unit.

* * * * *